United States Patent [19]
Judy et al.

[11] Patent Number: 5,315,972
[45] Date of Patent: May 31, 1994

[54] VEHICLE DIAGNOSTIC CONTROL SYSTEM

[75] Inventors: Steven W. Judy, Chillicothe; Vernon R. Smith; Alan L. Stahl, both of Peoria, all of Ill.

[73] Assignee: Caterpillar Inc., Peoria, Ill.

[21] Appl. No.: 838,279

[22] PCT Filed: Dec. 23, 1991

[86] PCT No.: PCT/US91/09742
§ 371 Date: Dec. 23, 1991
§ 102(e) Date: Dec. 23, 1991

[51] Int. Cl.$^5$ .............................................. F02B 77/00
[52] U.S. Cl. ................................ 123/198 D; 477/902; 477/906
[58] Field of Search ................... 123/198 D, 479, 319, 123/351, 352; 74/857, 861, 866, 856; 364/426, 424.1

[56] References Cited

U.S. PATENT DOCUMENTS

| | | | |
|---|---|---|---|
| 4,184,146 | 1/1980 | Fratzke et al. | 340/52 |
| 4,918,606 | 4/1990 | Ito et al. | 364/424.1 |
| 4,940,030 | 7/1990 | Morikawa | 123/198 D |
| 4,955,255 | 9/1990 | Yamaashi et al. | 74/856 |
| 4,960,091 | 10/1990 | Aufonkolk | 123/198 D |
| 5,060,608 | 10/1991 | Umeomoto | 123/198 D |
| 5,069,154 | 12/1991 | Carter | 123/198 D |
| 5,070,832 | 12/1991 | Hapka et al. | 123/198 D |
| 5,090,269 | 2/1992 | Ohtsuka et al. | 74/861 |
| 5,103,692 | 4/1992 | Shionanara et al. | 74/857 |
| 5,161,433 | 11/1992 | Sakakibara et al. | 74/866 |
| 5,275,056 | 6/1993 | Narada et al. | 123/198 D |

FOREIGN PATENT DOCUMENTS

0231155A1 1/1987 European Pat. Off. .
0310275A2 9/1988 European Pat. Off. .
WO79/00679 3/1979 PCT Int'l Appl. .
2062781A 10/1980 United Kingdom .
2084673A 9/1981 United Kingdom .

OTHER PUBLICATIONS

"Vehicle Electronics in the 90's: Proceedings of the International Congress on Transportation Electronics" published by Society of Automotive Engineers, Inc., Oct. 1990, pp.355-362.

Primary Examiner—Raymond A. Nelli
Attorney, Agent, or Firm—Kirk A. Vander Leest; R. Carl Wilbur

[57] ABSTRACT

In accordance with one aspect of the present invention, an apparatus is provided for a vehicle equipped with a drive system and a controller for regulating the operating speed of the drive system. The apparatus includes at least one sensor for sensing a vehicle parameter and producing a parameter signal in response to the sensed parameter. A diagnostic device is provided for receiving the parameter signal, processing the parameter signal to detect the presence of an undesirable operating condition; determining the severity of the undesirable operating condition in accordance with a preselected strategy and responsively producing a severity level signal. The controller receives the severity level signal and limits the maximum speed of the vehicle in response to the severity level signal, whereby the maximum allowable vehicle speed decreases as the severity level signal increases.

38 Claims, 6 Drawing Sheets

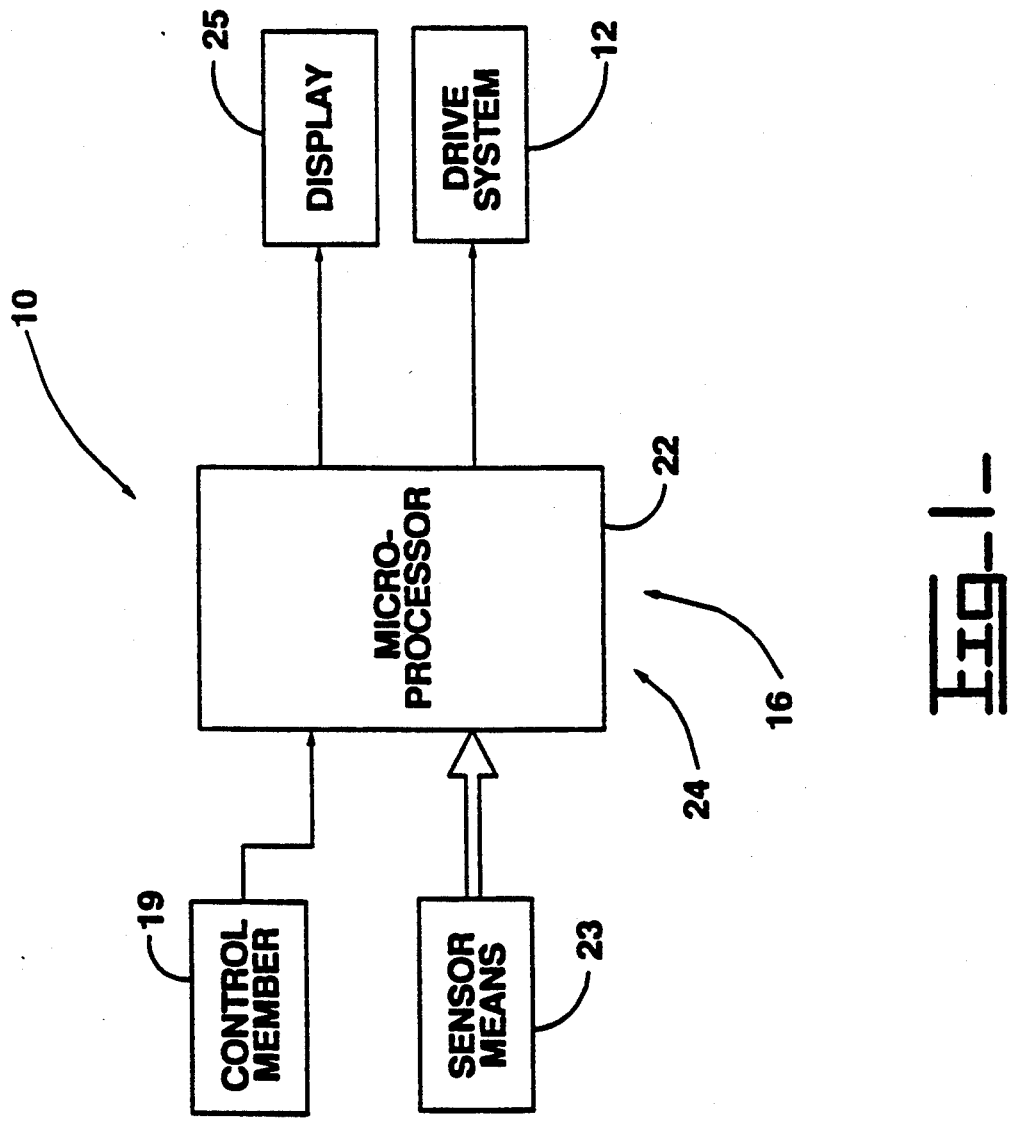

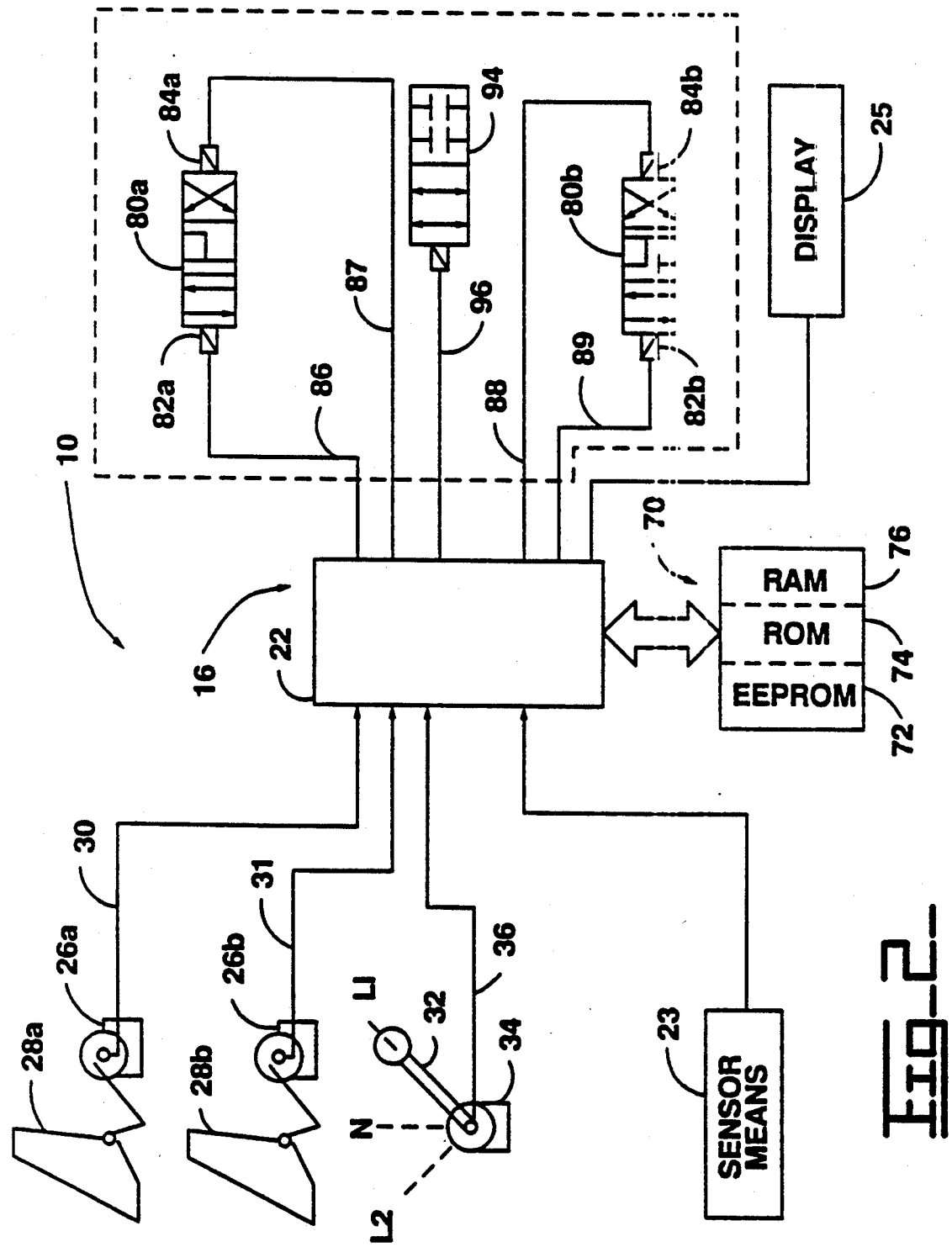

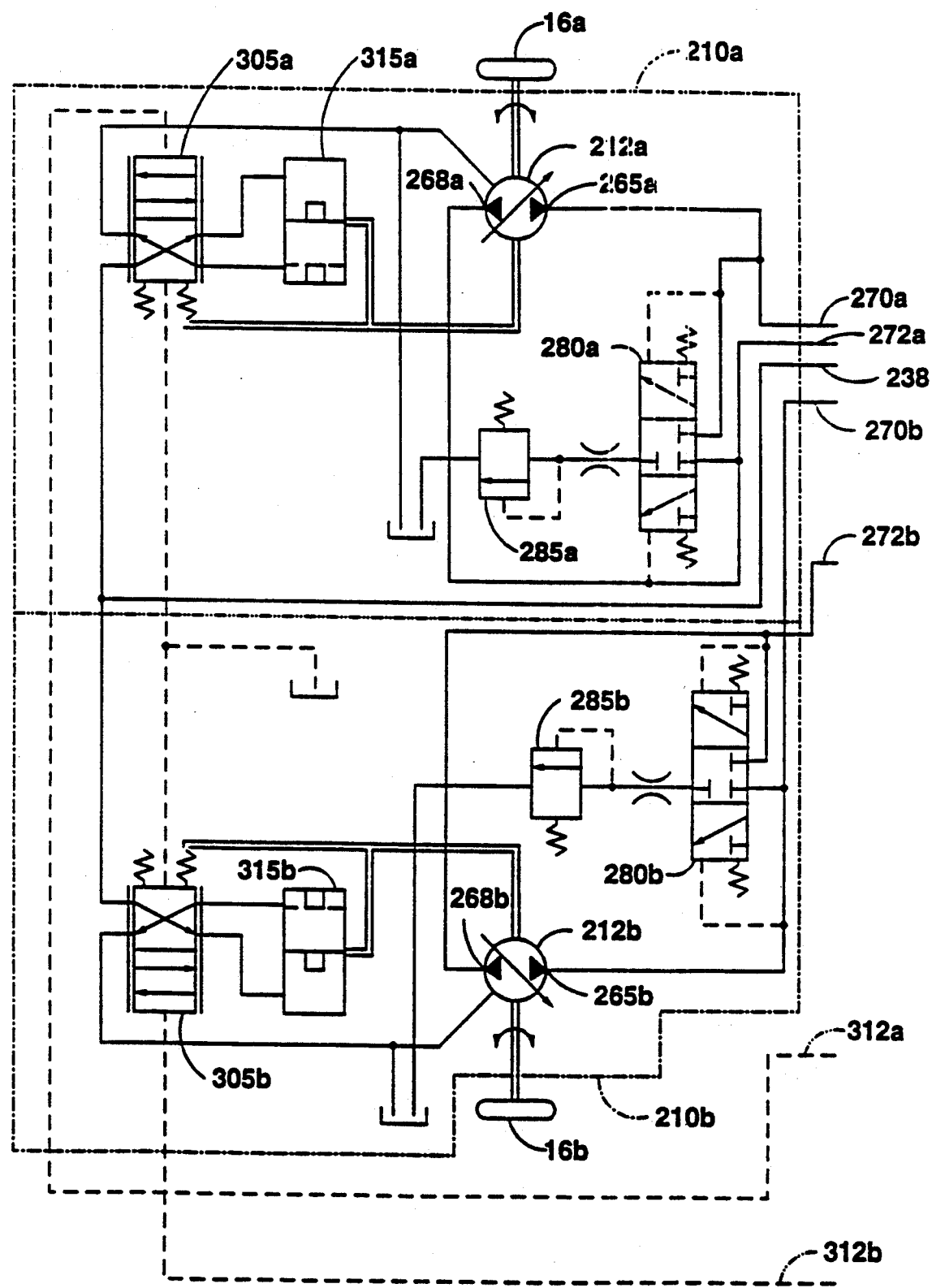
Fig_3A_

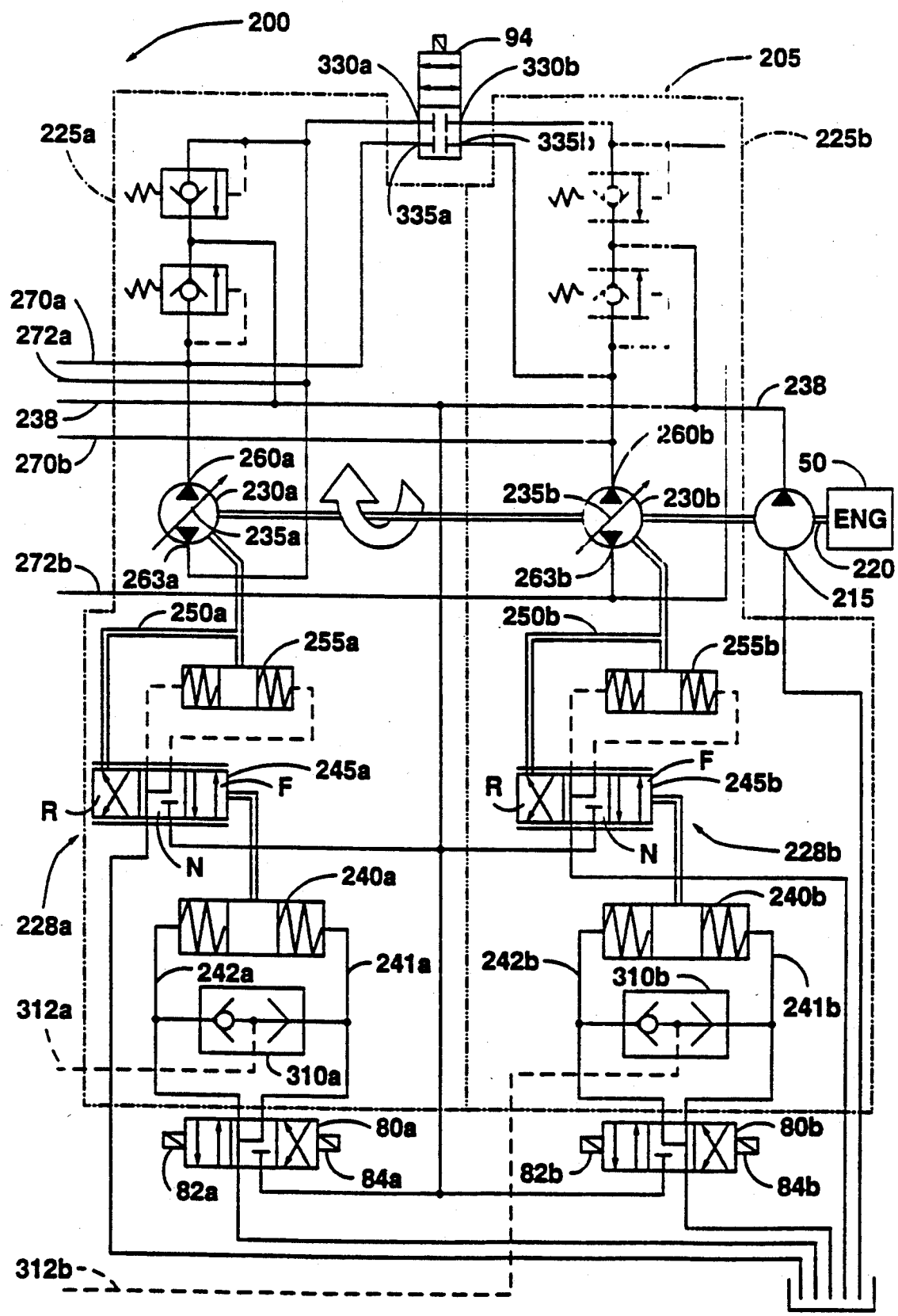
Fig_3B

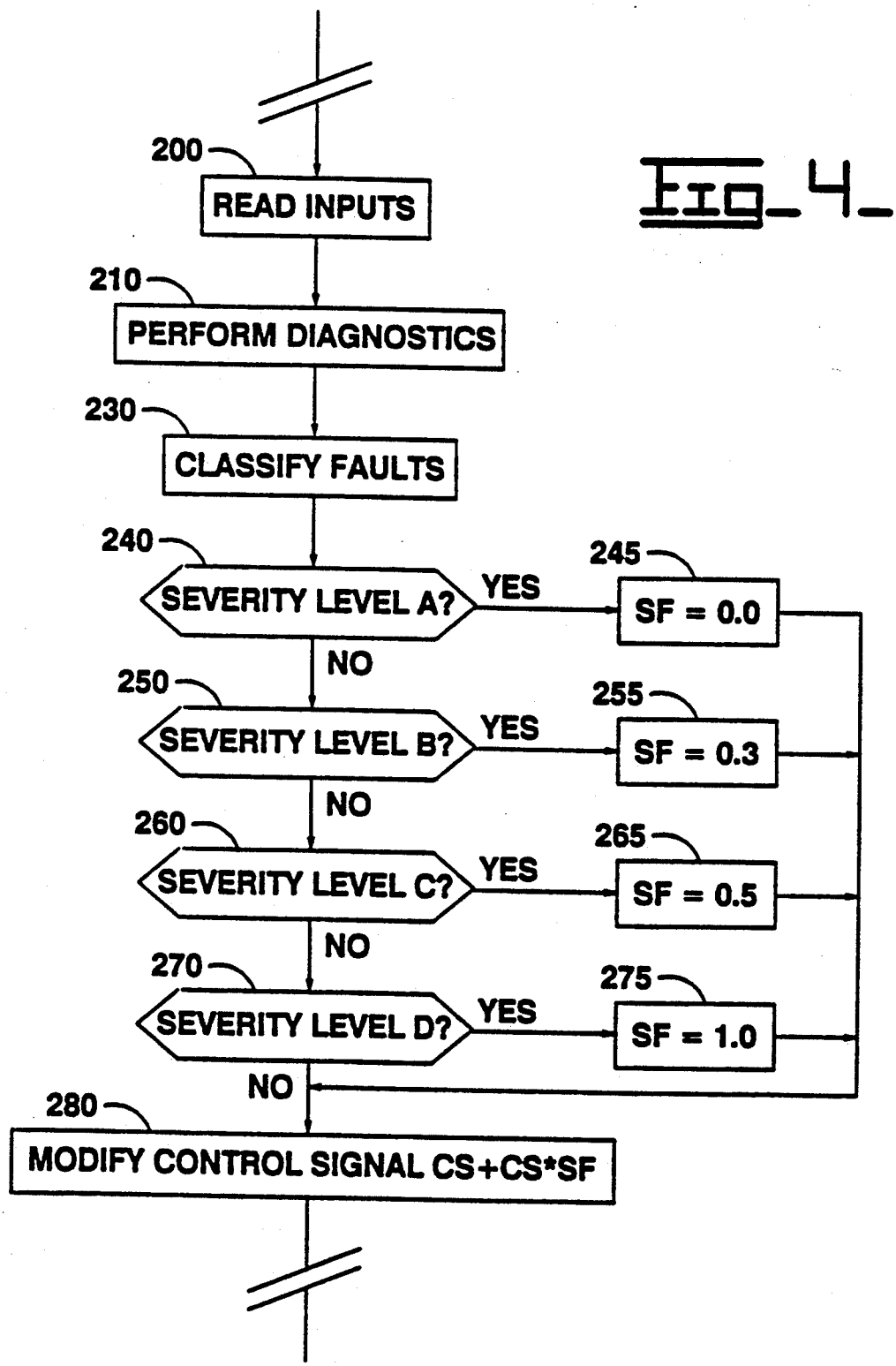
Fig_4_

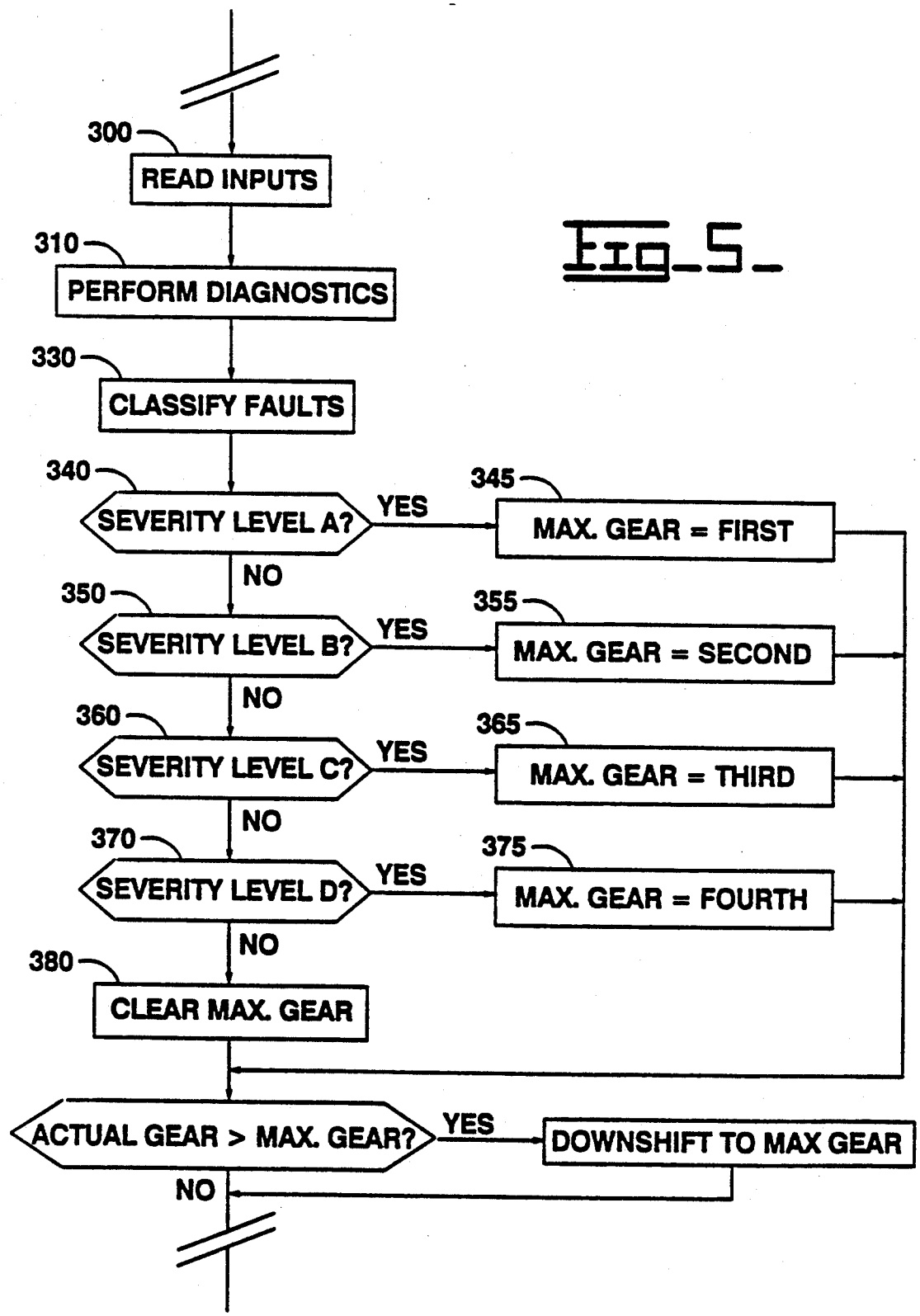

VEHICLE DIAGNOSTIC CONTROL SYSTEM

TECHNICAL FIELD

This invention relates to a transmission monitoring and control system for a vehicle and, more specifically, to a system which limits maximum vehicle speed and vehicle direction in response to a sensed fault.

BACKGROUND ART

In a variety of engine-powered vehicles, monitoring devices have been employed to detect the presence of various undesirable engine operating conditions, such as overheating, low oil pressure, low fuel, electrical system faults and the like. Such systems have provided indicators, such as warning lights, for alerting an operator of these sensed conditions.

The importance of the various monitored engine conditions usually varies as to criticality. For example, an air filter for an engine or a filter for the hydraulic fluid may gradually clog during operation of the vehicle. The vehicle operator should be warned of such clogging, but generally there is no when the vehicle returns for normal servicing and maintenance. A low fuel condition requires more immediate attention from the operator A loss of engine oil pressure or a loss of hydraulic fluid represent conditions which require immediate operator attention to prevent damaging the vehicle U.S. Pat. No. 4,184,146, which issued to Fratzke et al. on Jan. 15, 1980 and is assigned to the assignee herein, recognizes and partially addresses the above problems. Fratzke al. provides a system for warning a vehicle operator of an undesirable operating condition of one or more of a plurality of monitored operating parameters of an engine-powered vehicle. Three degrees of warning are given, depending upon the criticality of the monitored parameter. Individually energizable low-intensity warning indicators are provided for each of the monitored parameters, and a multiplexing circuit is provided for staggered pulsing of the indicators. The existence of any critical fault will cause an intermittent operation of a more intense warning device, while the existence of a highly critical fault results in an additional intermittent warning of a still greater degree of intensity.

However, if an operator ignores the warnings and continues to operate the vehicle, it is possible for the vehicle to be severely damaged. U.S. Pat. No. 5,070,832 issued to Hapka et al. is directed toward derating engine power in response to detecting certain faults relating to engine fluid levels. Hapka includes a second derate schedule for more severe fault conditions. According to this second schedule, the maximum engine speed is gradually reduced over a certain time period and to a certain percentage of the normal maximum engine rpm.

In vehicles having a hydrostatic transmission, other faults can be present that will go undetected by an engine controller such as the one disclosed in Hapka. Those other faults can detrimentally affect vehicle performance and may prevent the vehicle from being operated. For example, in a vehicle propelled using tracks, if the transmission for one of the tracks fails, then operating the other track will not allow the vehicle to move forward. Similarly, in transmissions that have a plurality of gear ratios a transmission fault could effect vehicle performance. In either of these cases, the engine may operate normally, but continued operation of the vehicle could damage the transmission or other portions of the vehicle.

It would be preferable to have a transmission monitoring and control system that limits maximum vehicle speed and vehicle direction in response to a sensed transmission fault.

Some transmission faults may not create an imminent danger of damage to the vehicle. Other faults may have a greater tendency to damage the vehicle at one level as opposed to other levels.

It would be preferable to have a transmission monitoring and control system that could classify sensed faults according to the likelihood that the fault would damage the vehicle under continued operation. Such system would preferably include a graduated reduction in maximum vehicle speed corresponding to the classification of the sensed fault.

The present invention is directed towards overcoming one or more of the problems as set forth above.

DISCLOSURE OF THE INVENTION

In accordance with one aspect of the present invention, an apparatus is provided for a vehicle equipped with a drive system and a controller for regulating the operating speed of the drive system. The apparatus includes at least one sensor for sensing a vehicle parameter and producing a parameter signal in response to the sensed parameter. A diagnostic device is provided for receiving the parameter signal, processing the parameter signal to detect the presence of an undesirable operating condition, determining the severity of the undesirable operating condition in accordance with a preselected strategy, and responsively producing a severity level signal. The controller receives the severity level signal and limits the maximum speed of the vehicle in response to the severity level signal, whereby the maximum allowable vehicle speed decreases as the severity level signal increases.

In accordance with another aspect of the present invention, the apparatus includes a plurality of sensors for sensing vehicle parameters and responsively producing respective parameter signals. A diagnostic device is provided for receiving the parameter signals, processing the parameter signals to detect the presence of undesirable operating conditions, determining a severity level for each detected undesirable operating conditions in accordance with a preselected strategy, determining the highest severity level for which an undesirable operating condition presently exists and producing a severity level signal in response to the highest detected severity level. The controller receives the severity level signal and limits the maximum speed of the vehicle in response to the severity level signal, whereby the maximum allowable vehicle speed decreases as the severity level signal increases.

In accordance with still another aspect of the present invention, an apparatus is provided for a vehicle equipped with a hydrostatic drive system. The hydrostatic drive system includes first and second hydrostatic transmissions. Each hydrostatic transmission includes a fluid pump driven by an engine and being responsive to a respective control signal to provide pressurized fluid in proportion thereto and a fluid motor connected to the pump and driven by the pressurized fluid. The vehicle drive system further includes an electronic control for producing the control signals to control the speed of fluid motors. The apparatus includes a plurality of sensors for sensing vehicle parameters and responsively producing respective parameter signals. A diagnostic device is provided for receiving the parameter signals; processing the parameter signals to detect the presence of undesirable operating conditions; classifying the detected undesirable operating conditions into one of a preselected number of hierarchical severity levels; determining the highest severity level for which an undesirable operating condition presently exists; and producing a severity level signal corresponding to the highest detected severity level. The electronic controller receives the severity level signal and limits the magnitude of the control signals in response to the severity level signal, whereby the maximum allowable value of the control signal decreases as the severity level signal increases.

BRIEF DESCRIPTION OF THE DRAWINGS

FIG. 1 is a schematic illustration of an embodiment of the present invention;

FIG. 2 is an electronic control for incorporating the present invention in a hydrostatic drive system;

FIGS. 3A-B is a detailed schematic of the hydrostatic drive system used in connection with the electronic control of FIG. 2;

FIG. 4 is a flow chart illustrating a computer program for practicing the present invention in with the system of FIG. 2 or with an engine controller; and, FIG. 5 is a flowchart illustrating a computer program for practicing the present invention in a transmission controller.

BEST MODE FOR CARRYING OUT THE INVENTION

The present invention concerns a method and apparatus for detecting faults in a vehicle transmission, categorizing the detected faults and limiting the speed and direction of vehicle travel. Several embodiments of the invention in a vehicle application are disclosed herein; however, the system was originally developed for use on a model 943B track type loader which includes a hydrostatic drive transmission and is manufactured by the assignee herein. This embodiment will be explained in greater detail below in connection with FIGS. 2 and 3A-B.

Referring now to FIG. 1, the invention will be generally described. A monitoring and control apparatus 10 is provided for a vehicle (not shown), such as a track type loader, equipped with a drive system 12 and a controller means 16 for regulating the operating speed of the drive system 12. The drive system 12 is shown generally in FIG. 1; however, it is explained in greater detail below in connection with FIGS. 3A-B.

The controller means 16 is connected to a manually operable control member 19 for receiving a desired speed signal. In the context of a track type loader the control member is in the form of a speed/direction lever (see FIG. 2). The controller means 16 processes the input signals, as explained below, and produces a control signal which is delivered to the drive system 12 for controlling the speed of the vehicle.

Preferably, the controller means 16 is implemented employing a microprocessor 22 with appropriate input and output signal conditioning circuits and memory devices (not shown) as would be apparent to one skilled in the art. A number of commercially available microprocessors are adequate to perform the function of the controller means 16; however, preferably the microprocessor 22 is a model MC6809 as manufactured by Motorola Semiconductor, Inc. of Phoenix, Ariz. The microprocessor 22 operates under software control to perform the functions of the controller means 16 as would be apparent to one skilled in the art.

The apparatus 10 includes at least one sensor means, indicated generally by reference numeral 23, which is provided for sensing a vehicle parameter and producing a parameter signal in response to the sensed parameter. Preferably, a plurality of sensors are provided for sensing respective vehicle parameters including hydraulic fluid pressure, solenoid malfunctions etc. and responsively producing respective parameter signals. The sensor means 23 can be embodied in a variety of commercially available sensors such as pressure transducers, coolant sensors, magnetic pick-up sensors, etc. The parameter signals can include, but are not limited to, pulse width modulated (PWM), frequency, and analog signals. It should be understood that the various parameter signals could also be obtained from other vehicle control and monitoring systems (not shown) such as payload monitors, engine control systems, etc. which are commonly present on engine-powered vehicles.

The parameter signals are delivered to a diagnostic means 24 through appropriate conditioning and interface circuits (not shown), as would be apparent to one skilled in the art. As shown in FIG. 1, the controller means 16 and the diagnostic means 24 are both embodied in a single microprocessor 22. However, it should be apparent that these means 16,24 could be embodied in separate microprocessors connected via a communications link. The diagnostic means 24 processes the parameter signals to detect the presence of an undesirable operating condition (i.e., operating faults.) The exact nature of the parameter diagnostics depends on the particular application for which the apparatus 10 is used; therefore, specific diagnostics will not be explained in greater detail herein.

The diagnostic means 24 also receives input signals from the various control means 19 and processes these signals to diagnose undesirable operating conditions in the vehicles electrical system (i.e., system faults.) For example, in the context of the hydrostatic drive system of FIGS. 2 and 3A-B, diagnostics are performed to detect if various electrical control valves in the drive system are functioning properly.

The diagnostic means 24 is further programmed to measure the values of the parameter signals and the input signals and categorize the measured signals into specific fault levels as a function of the value of the signals being above respective preselected fault values. More specifically, the diagnostic means 24 categorizes each detected signal into one of a preselected number of hierarchical fault levels in response to the signal being above a fault value. In the preferred embodiment, the apparatus 10 classifies each such signal into one of four fault levels depending on the value of the signal. However, it would be within the scope of the present invention to use fewer or greater than four fault levels if desired. In the preferred embodiment, class A, B, C, and D fault levels are provided, wherein each class represents a grouping of signal values that tend detrimentally to affect vehicle performance to the same degree. Thus, class A corresponds to a fault that degrades vehicle performance greater than all other classes and class D corresponds to a fault that may degrade vehicle performance the least. It should be understood that a given signal level may be classified at any one of the fault levels depending on its effect on vehicle performance.

It may be possible for more than one signal value to fall within a fault level at a given instance of time. Therefore, the diagnostic means 24 may simultaneously detect value within the class A fault level and a signal having a value placing it within the class D fault level. In this case, the diagnostic means determines the fault level tending to degrade vehicle performance the greatest and responsively produces a fault level signal which corresponds to that fault level. In the present example, since a class A fault will tend to degrade vehicle performance greater than a class D fault, the diagnostic means will produce a fault level signal corresponding to the class A fault.

The fault level signal is delivered to the controller means 16 which limits the magnitude of the maximum speed of the vehicle in response to the fault level signal. This is accomplished by modifying the control signal in response to the fault level signal. More specifically, the controller means 16 receives the fault level signal, and produces a shutdown factor in response to the fault level signal. Preferably, the shutdown factor is a value between 0% and 100%, wherein a different shutdown factor is selected for each of fault level signals. In the preferred embodiment, the value of the shutdown factor is set to 0.0 when a class A fault is present, 0.3 when a class B fault is present, 0.5 when a class C fault is present, and 1.0 when a class D fault is present. As explained above, the most degrading fault takes precedence. Thus, if a class A and a class D fault are both present, the controller means 16 will produce the 0.0 shutdown factor corresponding to a class A fault. The controller means 16 then multiplies the control signal with the shutdown factor, thereby limiting the value of the control signal to a preselected percentage of its maximum in dependance on the signal value falling within the most degrading fault class level. In the case of a hydrostatic drive, the control signal is used to control the speed of fluid powered drive motors and hence vehicle speed and direction of travel, as is explained below.

In still another embodiment, the apparatus 10 can be used in connection with a vehicle which includes a multispeed transmission (not shown) and a transmission controller (not shown) for controlling operation of the transmission in response to sensed vehicle parameters. Both transmissions and transmission controllers are well known in the art; hence, neither is explained in detail herein. In such an embodiment, the transmission controller can be programmed to limit the maximum allowable gear ratio in response to the class level of a detected fault. More specifically, the transmission controller can be programmed to receive the fault level signal and limit the maximum allowable gear ratio to a different gear ratio in each of the class levels. In this manner, the maximum allowable ground speed can be controlled as a function of the highest detected severity level.

A display means 25 is provided for indicating signal values falling within each of the four classes of faults. The display means 25 may take numerous forms such as a plurality of display gauges or a single gauge which sequentially displays faulty operating conditions, as would be apparent to one skilled in the art.

Referring now to FIG. 2, a more detailed electrical schematic for practicing the present invention in connection with a hydrostatic drive system (see FIGS. 3A-B) will be described. A first position sensor 26a is provided for sensing the position of a left steering pedal 28a and responsively producing a left steering signal which is delivered to the microprocessor 22 via an electrical conductor 30. Similarly, a second pedal sensor 26b is provided sensing the position of a right steering pedal 28b and responsively producing a right steering signal which is delivered to the microprocessor 22 via an electrical conductor 31. Preferably, the first and second sensors 26a,b are in the form of rotary potentiometers which produce output signals responsive to the degree of activation of a respective steering pedal 28a,b. Such sensors are well known in the art 30 and will not be explained in detail herein. A suitable sensor is disclosed in U.S. Pat. No. 4,915,075, which issued to Brown and is assigned to the assignee herein.

A manually operable control lever 32 is movable between first and second limits L1,L2 for indicating a desired speed and direction for the fluidly driven motors 212a,b. The first limit L1 indicates full-speed forward, the second position L2 indicates full-speed reverse, and a position intermediate the first and second limits indicates neutral N. The control lever 32 will hereinafter be referred to as the speed/direction (S/D) lever. The S/D lever 32 is provided with a scale (not shown) for indicating when the lever is at zero percent (i.e., neutral), two percent, twenty percent, forty percent, sixty percent, eighty percent and one hundred percent of maximum motor speed in both the forward and reverse directions. Preferably, the S/D lever 32 is infinitely variable between the first and second positions L1,L2; however, in some instances it might be desirable to provide a S/D lever having preselected detent positions. For example, the S/D lever 32 could have detents at each of the above-mentioned percentage points.

A third sensor 34 is provided for sensing the position of the S/D lever 32 and responsively producing a desired motor speed/direction signal. The desired speed/direction signal is communicated to the microprocessor 22 via an electrical conductor 36. It should be apparent that the function of the speed/direction lever 32 could be performed by other devices without departing from the scope of the invention. For example, two levers could be provided for respectively indicating a desired speed and a desired direction.

The microprocessor 22 is equipped with a memory device 70 which is accessed by the microprocessor 22 in a manner well known in the art. Preferably the memory device 70 includes a random access memory (RAM) 72, a read only memory (ROM) 74 and an electronically erasable programmable read only memory (EEPROM) 76. The EEPROM 76 is adapted to store data which relates the desired motor speed/direction signal to a first and second control signal in a preselected manner.

The microprocessor 22 is programmed to receive the desired speed signal, responsively retrieve at least a portion of the data from the memory device 70, and produce the first and second control signals in response to the retrieved data and the desired speed signal, as explained below.

The first and second control signals are delivered to first and second solenoid actuated control valves 80a,b in the hydrostatic drive 200 for controlling the speed and direction of the first and second motors 212a,b, respectively. The first and second valves 80a,b are three position proportional valves, each having a forward (F), reverse (R) and neutral (N) position. The control valves 80 are adapted to receive a charge pressure from a charge pump 215 (see FIGS. 3A-B) and deliver a control pressure responsive to the magnitude of the first and second signals, as explained below.

Each of the control valves 80a,b includes a forward solenoid 82a,b and a reverse solenoid 84a,b for controlling the direction and displacement of a respective valve. Hence, the first and second signals each consist of forward and reverse signals which are delivered to respective forward and reverse solenoids 82, 84. The first (left) forward control signal is communicated from the microprocessor 22 to the first (left) forward solenoid 82a via a conductor 86. The first (left) reverse control signal is communicated from the microprocessor 22 to the first (left) reverse solenoid 84a via a conductor 87. The second (right) forward control signal is communicated from the microprocessor 22 to the second (right) forward solenoid 82b via a conductor 88. The second (right) reverse control signal is communicated from the microprocessor 22 to the second (right) reverse solenoid 84b via a conductor 89.

The microprocessor 22 is programmed to controllable deliver one of the forward or reverse control signals to each of the valves 80a,b to effect vehicle operation in accordance with the steering and S/D signals. The magnitude of each control signal in turn controls the degree of displacement of the control valve 80a,b and hence the speed of a respective motor 212a,b. If neither solenoid 82,84 of a valve 80 is actuated, the valve 80 is biased to the neutral position (N), thereby stopping the flow of pressurized hydraulic fluid to the motor 212.

For purposes of producing the control signals, the EEPROM 76 contains first and second data tables which have data stored therein for relating the desired S/D signal to the first and second control signals in a preselected manner. In the preferred embodiment, the first and second data tables are further divided into respective forward and reverse data tables. Each of the four data tables has an equal number of discrete data elements for relating the desired motor speed signal to a respective one of the first forward, first reverse, second forward and second reverse control signals respectively. More specifically, each data table contains seven discrete data points (i.e., control signal values) which correspond respectively to zero percent, two percent, twenty percent, forty percent, sixty percent, eighty percent and one hundred percent of the respective maximum speed. The first and second control signals have electrical currents which vary between a minimum corresponding to the zero percent data point and a maximum corresponding to the 100 percent data point. The remaining data points correspond to the magnitude of the current at a respective percentage of the maximum speed. Control signal currents for speeds which are between the discrete data points are calculated using linear interpolation, as would be understood by one skilled in the art.

If the desired S/D signal indicates forward operation, the microprocessor 22 retrieves at least a portion of the discrete data points from the first and second forward data tables and uses linear interpolation to determine the exact value for the first and second control signals. Conversely, if the S/D signal indicates reverse motor operation, the microprocessor 22 retrieves at least a portion of the data points from the reverse data tables to calculate the first and second signals. The control signals are additionally modified in accordance with the steering signals from the left and right steering pedals 28a,b as would be apparent to one skilled in the art.

An electrohydraulic synchronizing (sync) valve 94 is adapted to receive a sync signal from the microprocessor 22 via a conductor 96. Operation of the sync valve 94 will be explained below in connection with FIGS. 3A-B.

Referring now to FIGS. 3A-B, a detailed hydraulic schematic of a hydrostatic drive system 200 which can be used with the present invention will be discussed. The hydrostatic drive system 200 includes a pump system 205 which is adapted to provided pressurized fluid to first and second drive motor systems 210a,b through a closed loop hydraulic system. The first and second drive motor systems 210a,b include first and second drive motors 212a,b which are adapted to receive the pressurized fluid and drive respective crawler tracks, thereby propelling the vehicle. The pump and motor systems 205, 210a,b are commercially available from Linde Hydraulic of Canfield, Ohio. These systems are available in a variety of drive capacities and the particular systems utilized are selected in accordance with desired vehicle performance characteristics. In the preferred embodiment, the drive system 200 is used on a model. 943B track type loader which is manufactured by the assignee herein. On this particular vehicle, the preferred pump and drive systems 205,210 are models BPV-50D and BMV-140, respectively.

A charge pump 215 is connected to an output shaft 220 of the engine 50 for rotation therewith. The charge pump 215 is adapted to provide pressurized fluid to the pump and drive systems 205, 210a,b as would be apparent to one skilled in the art. Inasmuch as charge pumps are well known in the art, no further description will be provided.

The pump system 205 includes first and second pump units 225a,b for controllably providing pressurized fluid to the first and second drive motor systems 210a,b respectively. The pump units 225a,b are identical, hence only the first pump unit 225a will be described herein. The pump unit 225a includes a pump controller 228a which is adapted to receive a pump control pressure from the control valve 80a and responsively adjust the direction and displacement of a fluid pump 230a. The fluid pump 230a is coupled to an output shaft 220 of the engine 50 for rotation therewith. The pump 230a is a reversible variable displacement pump having a swash plate 235a for controlling the direction and displacement of the pump 230a as is common in the art.

The control valve 80a is adapted to receive charge pressure from the charge pump 215 via a fluid conduit 238 and deliver the pump control pressure to the pump controller 228a in response to the magnitude of the control signal produced by the microprocessor 22. The pump controller 228a receives the pump control pressure and adjusts the position of the swash plate 235a in response to the control pressure. For this purpose, the pump controller 228a includes a hydromechanical servo valve 240a in fluid communication with the control valve 80a and for receiving the pump control pressure. When a forward control signal is applied to the forward solenoid 82a, a control pressure proportional to the forward signal is communicated to the servo valve 240a via a forward fluid conduit 241a. Similarly, when a reverse control signal is applied to the reverse solenoid 84a, a control pressure proportional to the reverse control signal is communicated to the servo valve 240 via a reverse fluid conduit 242a.

The servo valve 240a is mechanically coupled to a three-position hydromechanical valve 245a having a mechanical feedback means 250a. The valve 245a is normally positioned at a neutral position (N) and is movable to forward (F) and reverse (R) positions by the servo valve 240a. The hydromechanical valve 245a is fluidly coupled to the fluid conduit 238 for receiving the charge pressure. The valve 245a delivers the charge pressure to a swash plate actuator 255a to move the swash plate 235a in a direction and to a displacement responsive to the control signal applied to the control valve 80a.

More specifically, movement of the servo valve 240a mechanically shifts the position of the hydromechanical valve 245a to either the forward or reverse positions F,R. This in turn causes charge pressure to be delivered to the swash plate actuator 255a in a direction corresponding to the position of the valve 245a. When the swash plate 235a reaches the desired position, as indicated by the pump control pressure the mechanical feedback means 250a moves the hydromechanical valve 245a to the neutral position (N), thereby stopping flow of the charge pressure to the swash plate actuator 255a.

The pump 225a has forward and reverse ports 260a,263a which are connected to respective forward and reverse ports 265a,268a on the first motor 212a by fluid conduits 270a,272a, respectively. Since the first and second motor systems 210a,b are identical, only the first motor system 210a will be explained The motor system 210a includes a pilot actuated purge valve 280a connected between the fluid conduits 270a, 272a for connecting the motor port 265a,268a of lower pressure to tank. A relief valve 285a is connected between the purge valve 280a and system tank for preventing operation of the purge valve 280a below a preselected pressure, as would be apparent to one skilled in the art.

The first motor system 210a further includes a drive motor servo valve 305a for controlling displacement of the fluid motor 212a. The motor servo valve 305a is fluidly coupled to the conduit 238 for receiving the charge pressure. The servo valve 305a is also fluidly coupled to a check valve 310a via a fluid conduit 312a for receiving a pilot pressure which is proportional to the pump control pressure. The latter function is accomplished by connecting the check valve 310a between control valve 80 and the servo valve 240a. The servo valve 305a delivers a motor control pressure to a pump actuator 315a which mechanically adjusts the motor displacement in response to the received pressure, as would be apparent to one skilled in the art.

In a preferred embodiment, a sync valve 94 is included in the hydrostatic transmission. However, the present invention may also be utilized in connection with a hydrostatic transmission that does not have a sync valve 94. The sync valve 94 is connected between the first and second pump units 225a,b and is adapted to controllably connect and disconnect the pump units 225a,b to control fluid flow therebetween. More specifically, the sync valve 94 has first and second forward ports 335a,b which are connected to the first and second forward fluid conduits 270a,b. The sync valve 94 also has first and second reverse ports 330a,b which are connected to the first and second reverse fluid conduits 272a,b. The sync valve 94 is normally biased to a first position, as shown, at which communication between the first and second pump units 225a,b is blocked. The sync valve 94 is movable to a second position in response to a sync signal which is produced by the microprocessor 22. When the sync valve 94 is at the second position, interflow of hydraulic fluid between the first and second pump units 225a,b is permitted, thereby synchronizing the speeds of the first and second motors 212a,b.

The microprocessor 22 is programmed to deliver the sync signal when rectilinear vehicle travel is desired. If steering operations are desired, as indicated by the presence of left or right steering signals, the sync signal is not produced and, hence, the sync valve 94 is positioned at the first position.

Referring now to FIGS. 4 and 5, embodiments of software for programming the controller in accordance with certain aspects of the immediate invention is explained. FIGS. 4 and 5 are flowcharts illustrating a computer software program for implementing the preferred embodiment of the present invention. Specifically, FIG. 4 illustrates a software program which can be used in connection with the above-described hydrostatic drive system 200, or alternatively in connection with a transmission or similar controller. FIG. 5 illustrates a software program which can be used in conjunction with a transmission for controlling a transmission with a plurality of gear ratios. The programs depicted in these flowcharts are particularly well adapted for use with the microprocessor and associated components described above, although any suitable microprocessor may be utilized in practicing an embodiment of the present invention. These flowcharts constitute complete and workable design of the preferred software programs. The software programs may be readily coded from these detailed flowcharts using the instruction set associated with this system, or may be coded with the instructions of any other suitable conventional microprocessors. The process of writing software code from flowcharts such as these is a mere mechanical step for one skilled in the art.

Referring now specifically to FIG. 4, a flowchart illustrating a computer program which can be used in connection with the hydrostatic drive system of FIGS. 2 and 3A-B or with a transmission controller will be described.

Initially, in the block 200 the controller 16 reads the parameter signals and input signals from the various sensor means 23 and the control members 19. Control is then passed to the block 210 where the values of the parameter signals and the input signals are compared to certain predetermined fault value levels. As stated above, the present invention is not limited to any particular diagnostic tests; therefore, specific diagnostic tests are not disclosed herein.

Next, in the block 220 the parameter signals and input signals are categorized in one of four fault level classes (A-D) according to the value of the signal and the comparison to the fault value levels.

Thereafter, control is passed to the block 240. Since more than one undesirable operating condition may be present simultaneously, the diagnostic means 24 determines the class fault level for which the greatest degradation in vehicle performance may result and produces a fault level signal in response to that class level. In a preferred embodiment of the present invention, the hierarchy ranges from class A being most important to class D being least important. In blocks 240, 250. 260 and 270, the class levels of faults are prioritized. More specifically, in the block 240 it is determined if any faults of fault class level A exist. If a fault class level A is detected in the block 240, control is passed to the block 245. In the block 245 a shutdown factor SF is set to a preselected value. In the preferred embodiment, the shutdown factor is set to 0.0 if any fault class level A faults exist.

If no fault class level A fault is detected, control is passed to the decision block 250 where it is determined if any fault class level B fault is present. Similar tests are performed in the blocks 260 and 270 to detect the presence of faults having fault class levels C and D, respectively. If fault class levels B, C, or D are detected, the shutdown factor SF is set to preselected values in the blocks 255, 265 and 270, respectively. As should be apparent, the arrangement of the decisions blocks 240-270 ensures that the shutdown factor is selected in response to the highest detected fault class level After the steps 240-275 are executed, control is passed to the block 280 where the value of the control signal is modified in response to the value of the shutdown factor SF. More specifically, the value of the control signal is multiplied by the value of the shutdown factor SF, thereby limiting the control signal to a preselected percentage of its maximum value. Different values of the shutdown factor SF are selected for each of the severity levels such that the maximum allowable speed of the vehicle reduced as the detected severity levels increase These values are illustrated as 0.0 for level A, 0.3 for level B, 0.5 for level C and 1.0 for level D. It should be understood that these values are purely illustrative and are not limitations on the present invention. Moreover, it should be noted that in the case of the hydrostatic drive circuit 200 discussed above, the control signal actually consists of the first and second control signals. The control signal is delivered to the vehicle drive system to control the speed of the vehicle. In this manner, the maximum speed of the vehicle can be limited in response to the highest class fault level.

In still another embodiment, the program of FIG. 4 can be used to modify the desired speed signal as is input from the S/D lever or an accelerator pedal, for example. In such an embodiment, the steps 200-275 are identical to those illustrated in FIG. 4. The value of the desired speed signal is then modified by the value of the shutdown factor in the block 280. More specifically, the control is programmed to multiply the desired speed signal by the shutdown factor, thereby limiting the maximum value of the desired speed signal to a preselected percentage of its maximum. Modification of the desired speed signal in this manner has essentially the same effect as modifying the control signal.

Referring now to FIG. 5, still another embodiment of the present invention will be discussed. FIG. 5 illustrates software to be used in connection with the diagnostic means 24 and a transmission controller for use with a transmission having a plurality of gear ratios. Inasmuch as transmission controllers are well known in the art, no description of such devices is provided herein. Essentially, the steps 300-370 parallel the steps 200-270 of FIG. 4 In the blocks 345, 355, 365 and 370, the control is programmed to select a maximum allowable gear ratio in response to the highest detected fault class level As can be seen, higher fault class levels result in lower maximum gear ratios. More specifically, the maximum allowable gear is set to first, second, third and fourth in response to fault class levels A, B, C, D, respectively. In this manner, the maximum allowable ground speed can be controlled as a function of the highest detected fault class level.

Control is then passed to the block 380 where it is determined if the actual transmission gear ratio is less than or equal to the maximum allowable gear ratio. If it is not, control is passed to the block 385 where the transmission is controllably downshifted to the maximum allowable gear ratio.

INDUSTRIAL APPLICABILITY

Assume that the apparatus 10 is installed on a vehicle such as a track type loader. The vehicle is equipped with a plurality of sensors 24 for sensing vehicle parameters and producing respective parameter signals. The parameter signals and various control signals are delivered to the microprocessor 22. The microprocessor 22 processes the received signals to detect undesirable operating conditions.

The microprocessor 22 continuously processes the received signals and compares those signals to preselected fault values. When the values of those signals exceed the fault value, an undesirable operating condition exists. As long as no faults are detected, the vehicle is allowed to operate at its maximum capacity. However, if a fault is present, each parameter signal or input signal that exceeds a fault value is classified into one of a plurality of fault class levels according to the magnitude of degradation in vehicle performance that might be caused by the fault. The microprocessor 22 then calculates the highest fault class level which exits and responsively produces a fault level signal. The fault level signal is delivered to the controller means which produces a shutdown factor in response to the fault level signal. For example, if the severity level signal corresponds to level B, the shutdown factor is set to 0.3. The microprocessor 22 then limits the speed of the vehicle to 30% of the operator requested value by multiplying the control signal by the shutdown factor. In this manner, the maximum speed of the vehicle is limited as a function of the class level of the detected vehicle fault.

Hydrostatic transmissions may have many types of operating faults that will detrimentally affect vehicle performance. For example, in the preferred embodiment of the present invention, solenoid actuated control valves 80a,b are integral with the hydrostatic transmission. If the forward solenoid 82a were to fail, then the left track of the vehicle could not be moved. In prior art hydrostatic transmission controls if the operator were to command the tractor to move forward, the right track would begin to move and the left track would remain stationary causing the tractor to spin in circles.

By using the present invention, the controller 16 can detect that the solenoid is bad (probably by sensing an open circuit in electrical conductor 86 connecting the controller to the solenoid caused by a faulty solenoid coil) and categorize the fault level. In a preferred embodiment failure of a forward solenoid 82a,b may be classified as a fault class level A thereby preventing the operator from attempting to move the vehicle and preventing the otherwise resulting spinning in circles. Since, in this case, the reverse solenoids function properly, the operator could attempt to move the vehicle in a reverse direction. Thus, the controller can classify the fault as a fault class level A in the forward direction, but permit the operator to move the vehicle in reverse.

Other similar faults may develop that are critical to the operation of the vehicle. Such faults may include left or right pump 230a,b failure, left or right motor 212a,b failure, loss of hydraulic fluid, etc. Other less severe faults may include an inoperable left steering pedal sensor 26a, an inoperable sync valve 94, reduced hydraulic pressure, etc. In these later cases, the faults may be categorized below a fault class level A so that the operator will be able to move the vehicle at a reduced speed. In this manner, the present invention can control the maximum vehicle speed and direction when a transmission fault is present.

We claim:

1. A method for controlling a vehicle equipped with a drive system, a controller means for regulating the operating speed of the drive system and a diagnostic means for sensing at least one transmission operating parameter, comprising steps of:
   comparing the value of the parameter signal to a fault level value;
   classifying the parameter signal within one of a plurality of fault class levels in response to said step of comparing, wherein parameter signals within each fault class level have a similar likelihood that continued operation of the vehicle will result in vehicle damage;
   producing a fault level signal corresponding to said fault class level of said parameter signal; and
   limiting the maximum speed of the vehicle as a function of the fault class level of the parameter signal.

2. A method as set forth in claim 1 wherein the speed of the vehicle is controlled in response to a control signal and wherein the magnitude of the control signal is limited in response to the fault class level.

3. A method as set forth in claim 2, including the step of:
   limiting the magnitude of the control signal as a function of highest fault class level for which a parameter signal was sensed.

4. A method as set forth in claim 3 wherein the step of limiting the magnitude of the control signal includes multiplying the control signal by a shutdown factor, wherein a different shutdown factor is selected for each of the fault class levels.

5. A method as set forth in claim 4 wherein the vehicle includes a hydrostatic drive system having at least one hydraulic motor which is controlled in response to the control signal.

6. A method as set forth in claim 1 wherein the vehicle includes a transmission having a plurality of gear ratios and the maximum allowable gear ratio is limited in response to the fault class level of a detected fault.

7. A method as set forth in claim 6, including the step of:
   limiting the maximum allowable gear ratio to a different gear ratio for each fault class level.

8. A method as set forth in claim 1 wherein the speed of the vehicle is controlled in response to a desired speed signal and the step of limiting the speed of the vehicle includes limiting the magnitude of the desired speed signal as a function of the highest fault class level, whereby the value of the limited magnitude is less for higher fault class levels.

9. A method as set forth in claim 1, including the step of:
   limiting the magnitude of the desired speed signal as a function of the highest fault class level for which a parameter signal was sensed.

10. A method as set forth in claim 9 wherein the step of limiting the magnitude of the desired speed signal includes multiplying the desired speed signal by a shutdown factor, wherein a different shutdown factor is selected for each of the fault class levels.

11. A method for controlling a vehicle equipped with a drive system, a controller means for regulating the operating speed of the drive system and a diagnostic means for sensing a plurality of drive system operating parameters, comprising the steps of:
    sensing a plurality of the parameter signals;
    comparing the value of each parameter signal to a corresponding predetermined fault value;
    classifying each parameter signal within one of a plurality of fault class levels as a function of said step of comparing;
    calculating a hierarchy between fault class levels, each class level being a function of the probability that faults within that level will cause vehicle damage, a highest class level including faults having the greatest probability of causing vehicle damage and the lowest class level including faults having the lowest probability of causing vehicle damage;
    calculating the highest fault class level in which a parameter signal has been classified; and
    limiting the maximum speed of the vehicle in response to the highest fault class level, whereby the maximum vehicle speed decreases as the fault class level increases.

12. A method as set forth in claim 11 wherein the speed of the vehicle is controlled in response to a control signal and wherein the magnitude of the control signal is limited in response to the fault class level.

13. A method as set forth in claim 12, including the step of:
    limiting the magnitude of the control signal in response to the highest fault class level for which an undesirable operating condition presently exists.

14. A method as set forth in claim 13 wherein the step of limiting the magnitude of the control signal includes multiplying the control signal by a shutdown factor, wherein a different shutdown factor is selected for each fault class level.

15. A method as set forth in claim 14 wherein the vehicle includes a hydrostatic drive system having at least one hydraulic motor which is controlled in response to the control signal.

16. A method as set forth in claim 11 wherein the vehicle includes a transmission having a plurality of gear ratios and the maximum allowable gear ratio is limited as a function of the highest fault class level of a sensed parameter signal.

17. A method as set forth in claim 16 including the step of:
    limiting the maximum allowable gear ratio to a different gear ratio for each of the fault class levels.

18. A method as set forth in claim 11 wherein the speed of the vehicle is controlled in response to a desired speed signal and the step of limiting the speed of the vehicle includes limiting the magnitude of the desired speed signal as a function of the fault class level of each sensed parameter signal whereby the limit on the desired speed signal is greater as the fault class level increases.

19. A method as set forth in claim 18, including the step of:
    limiting the magnitude of the desired speed signal as a function of the highest fault class level for which a parameter signal is sensed.

20. A method as set forth in claim 19 wherein the step of limiting the magnitude of the desired speed signal includes multiplying the desired speed signal by a shutdown factor, wherein a different shutdown factor is selected for each fault class level.

21. An apparatus for a vehicle equipped with a drive system and a controller means for regulating the operating speed of the drive system, comprising in combination:
- at least one sensor means for sensing a vehicle parameter, said sensor producing a parameter signal in response to the sensed parameter;
- diagnostic means for receiving the parameter signal, comparing the parameter signal to a predetermined fault value, classifying the parameter signal in one of a plurality of fault class levels as a function of said comparison with said fault value, and responsively producing a fault level signal;
- wherein said plurality of fault class levels includes a hierarchy in which a highest fault class level includes parameter signals indicating the highest risk of vehicle damage for continued vehicle operation, and a lowest fault class level includes parameter signals indicating the lowest risk of vehicle damage for continued vehicle operation;
- wherein the controller means receives the fault level signal and limits the maximum speed of the vehicle in response to the fault level signal, whereby the maximum allowable vehicle speed decreases as the fault class level signal increases.

22. An apparatus as set forth in claim 21 wherein the controller means produces a control signal which controls the speed of the vehicle and wherein the controller means limits the magnitude of the control signal in response to the fault level signal.

23. An apparatus as set forth in claim 22 wherein the controller means receives the fault level signal, produces a shutdown factor in response to the fault level signal and multiplies the control signal by the shutdown factor, wherein a different shutdown factor is selected for each fault class level.

24. An apparatus as set forth in claim 23 wherein the vehicle includes a hydrostatic drive system having at least one hydraulic motor which is controlled in response to the control signal.

25. An apparatus as set forth in claim 21 wherein the vehicle includes a transmission having a plurality of gear ratios, a transmission controller controlling operation of the transmission in response to sensed vehicle parameters, and wherein the transmission controller limits the maximum allowable gear ratio as a function of the fault class level of the sensed parameter signal.

26. An apparatus as set forth in claim 25 wherein the controller means is adapted to receive a desired speed signal and responsively produce a control signal for controlling the speed of the vehicle, and wherein the controller means receives the fault level signal and limits the magnitude of the desired speed signal as a function of the fault level signal.

27. An apparatus as set forth in claim 26 wherein the controller means receives the fault level signal, produces a shutdown factor signal in response to the severity level signal and multiplies the desired speed signal by the shutdown factor signal, wherein a different shutdown factor is selected for each of the value of the severity signal.

28. An apparatus for a vehicle equipped with a drive system and a controller means for regulating the operating speed of the drive system, comprising:
- a plurality of sensor means for sensing vehicle parameters and responsively producing respective parameter signals;
- diagnostic means for receiving the parameter signals, comparing the parameter signal to a fault value, classifying the parameter signal in one of a plurality of fault class levels as a function of the comparison between said parameter signal and said fault value, and producing a fault level signal corresponding to a fault class level of said parameter signal, said fault class levels being prioritized according to a probability that parameter signals within that fault class level will damage the vehicle; and
- wherein the controller means receives the fault level signal and limits the maximum speed of the vehicle as a function of said fault level signal, whereby the controller means decreases a maximum allowable vehicle speed in response to sensing parameter signals in fault class levels that have increasing probability of vehicle damage.

29. An apparatus as set forth in claim 28, wherein the controller means produces a control signal which controls the speed of the vehicle and wherein the controller means limits the magnitude of the control signal as a function of the fault class level of a sensed parameter signal.

30. An apparatus as set forth in claim 29, wherein the magnitude of said fault level signal varies depending on the fault class level of said parameter signal.

31. An apparatus as set forth in claim 30, wherein the controller means receives the fault level signal, produces a shutdown factor in response to the fault level signal and multiplies the control signal by a shutdown factor, wherein a different shutdown factor is selected for each fault class level.

32. An apparatus as set forth in claim 31, wherein the vehicle includes a hydrostatic drive system having at least one hydraulic motor which is controlled in response to the control signal.

33. An apparatus as set forth in claim 28, wherein the vehicle includes a transmission having a plurality of gear ratios, a transmission controller controlling operation of the transmission in response to sensed vehicle parameters, and wherein the transmission controller is adapted to limit the maximum allowable gear ratio as a function of the fault class level of a sensed vehicle parameter.

34. An apparatus as set forth in claim 33, wherein the diagnostic means responsively produces a fault level signal corresponding to the parameter signal within the fault class level having the highest probability of damaging the vehicle; and
- wherein the transmission controller is adapted to receive the fault level signal and limit the maximum allowable gear ratio to a different gear ratio for each fault class level.

35. An apparatus as set forth in claim 34, wherein the controller means is adapted to receive a desired speed signal and responsively produce a control signal for controlling the speed of the vehicle, and wherein the controller means receives the fault level signal and limits the magnitude of the desired speed signal in response to the magnitude of the fault level signal, whereby the limit on the magnitude of the desired speed signal is increased as the fault level signal increases.

36. An apparatus as set forth in claim 35, wherein the controller means receives the fault level signal, produces a shutdown factor signal in response to the fault level signal and multiplies the desired speed signal by the shutdown factor signal, wherein a different shutdown factor is selected for each value of fault level signal.

37. An apparatus for a vehicle equipped with a hydrostatic drive system, the drive system including first and second hydrostatic transmissions, each hydrostatic transmission including a fluid pump driven by an engine and being responsive to a respective control signal to provide pressurized fluid in proportion thereto and a hydraulic motor connected to the pump and being driven by the pressurized fluid, the drive system further including controller means for producing the control signals, said apparatus comprising:

a plurality of sensor means for sensing vehicle parameters and responsively producing respective parameter signals;

diagnostic means for receiving the parameter signals, comparing the parameter signal to a fault value, classifying the parameter signal in one of a plurality of fault class levels as a function of the comparison between said parameter signal and said fault value, and producing a fault level signal corresponding to a fault class level of said parameter signal, said fault class level being prioritized according to a plurality that parameter signals within that fault class level will damage the vehicle; and wherein the controller means receives the fault level signal and limits the magnitude of the control signals as a function of the fault level signal, whereby the maximum allowable value of the control signal decreases as the value of the fault level signal increases.

38. An apparatus for a vehicle equipped with a hydrostatic drive system, the drive system including first and second hydrostatic transmissions, each hydrostatic transmission including a fluid pump driven by an engine and being responsive to a respective control signal to provide pressurized fluid in proportion thereto and hydraulic motor connected to the pump and being driven by the pressurized fluid, the drive system further including a controller means, said apparatus comprising:

a plurality of sensor means for sensing vehicle parameters and responsively producing respective parameter signals;

diagnostic means for receiving the parameter signals, comparing the parameter signal to a fault value, classifying the parameter signal into one of a preselected number of hierarchical fault class levels, determining the highest fault class level in which a parameter signal is classified and producing a fault level signal corresponding to the highest detected fault class level; and wherein the controller means receives the fault level signal and limits the magnitude of the control signals in response to the fault level signal, whereby the maximum allowable value of the control signal decreases as the value of the fault level signal increases.

* * * * *

UNITED STATES PATENT AND TRADEMARK OFFICE
CERTIFICATE OF CORRECTION

PATENT NO. : 5,315,972

DATED : May 31, 1994

INVENTOR(S) : Steven W. Judy et al.

It is certified that error appears in the above-identified patent and that said Letters Patent is hereby corrected as shown below:

In column 17, claim 37, line 23, "plurality" should be --probability--.

In column 18, claim 38, line 8, after "and", insert --a--.

Signed and Sealed this

Twenty-seventh Day of December, 1994

*Attest:*

BRUCE LEHMAN

*Attesting Officer*     *Commissioner of Patents and Trademarks*